United States Patent [19]

Schoenmeyer

[11] Patent Number: 5,101,950
[45] Date of Patent: Apr. 7, 1992

[54] FLUID COUPLING DEVICE WITH IMPROVED DUMP TIME

[75] Inventor: James Schoenmeyer, Marshall, Mich.

[73] Assignee: Eaton Corporation, Cleveland, Ohio

[21] Appl. No.: 633,899

[22] Filed: Dec. 26, 1990

[51] Int. Cl.$^5$ .............................................. F16D 35/00
[52] U.S. Cl. .............................. 192/58 B; 123/41.12
[58] Field of Search .................... 192/58 B; 123/41.12

[56] References Cited

U.S. PATENT DOCUMENTS

| | | | |
|---|---|---|---|
| 3,727,735 | 4/1973 | La Flame | 192/58 B |
| 3,809,197 | 5/1974 | Clancey | 192/58 B |
| 3,856,122 | 12/1974 | Leichliter | 192/58 B |
| 4,064,980 | 12/1977 | Tinholt | 192/58 B |
| 4,086,988 | 5/1978 | Spence | 192/58 B |
| 4,086,990 | 5/1978 | Spence | 192/58 B |
| 4,403,757 | 9/1983 | Shepherd | 192/58 B |
| 4,627,523 | 12/1986 | Light | 192/58 B |
| 4,667,792 | 5/1987 | Hauser | 192/58 B |
| 4,678,070 | 7/1987 | Light | 192/58 B |
| 4,779,323 | 10/1988 | Bloemendaal | 192/58 B X |
| 4,796,571 | 1/1989 | Ono et al. | 123/41.12 |
| 4,817,774 | 4/1989 | Digele | 192/58 B |
| 4,874,071 | 10/1989 | White | 192/58 B |
| 4,924,984 | 5/1990 | Kennedy | 192/58 B |
| 4,967,889 | 11/1990 | Ihlemann | 192/58 B |

OTHER PUBLICATIONS

Four Photographs of Nissan Motorcar Company's Part #21082-88G00.

Primary Examiner—Leslie A. Braun
Assistant Examiner—Nicholas Whitelaw
Attorney, Agent, or Firm—L. J. Kasper

[57] ABSTRACT

A fluid coupling device is provided of the type including a housing member (15) and a cover member (17), and a valve plate (31) disposed therebetween to define a fluid operating chamber (33) and a fluid reservoir chamber (35) containing fluid defining a fluid level (F), when the device is shutdown in the disengaged condition. The valve plate defines a discharge opening (47) through which fluid is pumped from the operating chamber back into the reservoir. In accordance with the invention, the cover member (17') defines an annular groove (57; 57'), including a upstream portion (59; 59'), and the cover defines a downstream portion (67; 67') in open communication between the annular groove and the reservoir. The circumferential extent of the annular groove is at least about 180 degrees, such that either the upstream portion or the downstream portion is above the fluid level for any rotational orientation of the device. The invention prevents bleedback of fluid into the operating chamber during shutdown, and substantially eliminates the problem of "morning sickness", and the related undesirable noise.

15 Claims, 6 Drawing Sheets

PRIOR ART

FLUID COUPLING DEVICE WITH IMPROVED DUMP TIME

BACKGROUND OF THE INVENTION

The present invention relates to fluid coupling devices of the type including both a fluid operating chamber and a fluid reservoir chamber, and valve means operable to control the quantity of fluid in the operating chamber.

Although the present invention may be used advantageously in fluid coupling devices having various configurations and applications, it is especially advantageous in a coupling device of the type used to drive a radiator cooling fan of an internal combustion engine, and will be described in connection therewith.

Fluid coupling devices of the viscous shear type have been popular for many years for driving engine cooling fans, primarily because their use results in a substantial saving of engine horsepower, resulting from the fact that the coupling operates in the engaged position only when cooling is needed, but operates in a disengaged, relatively lower speed condition when little or no cooling is required.

For many years, one of the problems associated with fluid coupling devices used to drive radiator cooling fans has been the phenomenon known as "morning sickness". A typical fluid coupling device includes one or more fill openings, through which viscous fluid flows from the reservoir into the operating chamber, and one or more discharge openings, through which fluid is pumped from the operating chamber into the reservoir. After the coupling device has been operating for a period of time, and the engine is turned off, the coupling device ceases rotation. When the device stops rotating, the orientation of the fill and discharge openings are completely random.

If the discharge opening is below the fluid level in the reservoir, of a typical coupling device, a certain amount of fluid will leak from the reservoir, back through the discharge opening, into the operating chamber.

When operation of the fan drive begins again, after a long period of time (for example, the next morning), there is a substantial amount of fluid in the operating chamber. As a result, although the engine is cold and no cooling is required, the coupling device will operate in the engaged condition for a period of time, until most of the fluid in the operating chamber is pumped back into the reservoir chamber. Unfortunately, such engaged operation results in undesirable noise of the fan being driven when it is not required. This phenomenon, most common and perhaps most objectionable in the morning, has been referred to as "morning sickness".

A number of different solutions have been tried over the years, with the main objective being faster pumpout of fluid which does leak back into the operating chamber, from the reservoir chamber, during a period of prolonged shutdown of the coupling device. Certain of these attempted solutions have been helpful in reducing the "dump time", but have not really solved the fundamental problem, i.e., the drain back of fluid into the operating chamber.

A different type of solution is illustrated in U.S. Pat. No. 4,312,433, assigned to the assignee of the present invention. In the cited patent, the cover of the fluid coupling has a counterbore where the discharge passage enters the reservoir chamber, and a tubular member (a "standpipe") is received in the counterbore. The standpipe typically extends to a location near the rotational axis of the coupling device, such that its radially innermost end is likely to be above the fluid level of the fluid in the reservoir chamber. The standpipe concept has been generally satisfactory in reducing bleedback and "morning sickness", but requires a substantially more complex and expensive cover casting, and more machining. In addition, with the typical standpipe arrangement, the coupling device may still have certain orientations which permit fluid bleedback, from the reservoir into the operating chamber.

SUMMARY OF THE INVENTION

Accordingly, it is an object of the present invention to provide an improved fluid coupling device in which drain back (or bleedback) of fluid from the reservoir chamber into the operating chamber is substantially prevented.

It is a more specific object of the present invention to provide such an improved coupling device in which bleedback is substantially prevented, regardless of the rotational orientation of the coupling device (and of the discharge opening) while the coupling device is in the shutdown condition.

It is a further object of the present invention to provide such an improved coupling device in which bleedback is substantially prevented, regardless of the fluid level in the reservoir chamber, i.e., the fluid level in the reservoir can be above the axis of rotation of the coupling device.

It is a further object of the present invention to provide an improved fluid coupling device which accomplishes the above-stated objects, but without adding any additional structural elements, and without adding to the overall size or complexity of the coupling device.

The above and other objects of the invention are accomplished by the provision of an improved fluid coupling device of the type including a first rotatable coupling member defining an axis of rotation, enclosure means associated with the first coupling member to define a fluid chamber therebetween, and valve means associated with the first coupling member and disposed to separate the fluid chamber into a fluid operating chamber and a fluid reservoir chamber. A second rotatable coupling member is disposed in the operating chamber, and is rotatable relative to the first coupling member. Either the first coupling member or the enclosure means cooperates with the second coupling member to define a viscous shear space therebetween. The valve means is operative to control the flow of fluid between the reservoir chamber and the operating chamber, and there is means operable to pump fluid from the operating chamber into the reservoir chamber in response to a difference in speed of rotation of the coupling members. The valve means includes a plate-like member disposed between the operating chamber and the reservoir chamber, and having at least its outer periphery disposed in tight sealing engagement with either the enclosure means or the first coupling member, the plate-like member being provided with a pumping element and defining a discharge orifice. The fluid in the reservoir chamber defines a fluid level when a major portion of the fluid is in the reservoir chamber.

The improved coupling device is characterized by the enclosure means and the plate-like member cooperating to define a generally annular groove blocked, over at least a major portion thereof, from fluid communication with either the operating chamber or with the reservoir chamber. The annular groove includes an upstream portion in open communication with the discharge opening, and a downstream portion in open fluid communication with the reservoir chamber. The annular groove has a circumferential extent such that, for any particular rotational orientation of the coupling device, either the upstream portion or the downstream portion is disposed above the fluid level.

In accordance with a further aspect of the present invention, the annular groove has a circumferential extent of 360 degrees, whereby the annular groove is operable to communicate fluid from the discharge opening to the reservoir chamber through two passage halves for purposes of symmetry, and the upstream portion and downstream portion are circumferentially displaced, relative to each other, approximately 180 degrees.

DESCRIPTION OF THE PREFERRED EMBODIMENTS

Figure 1:
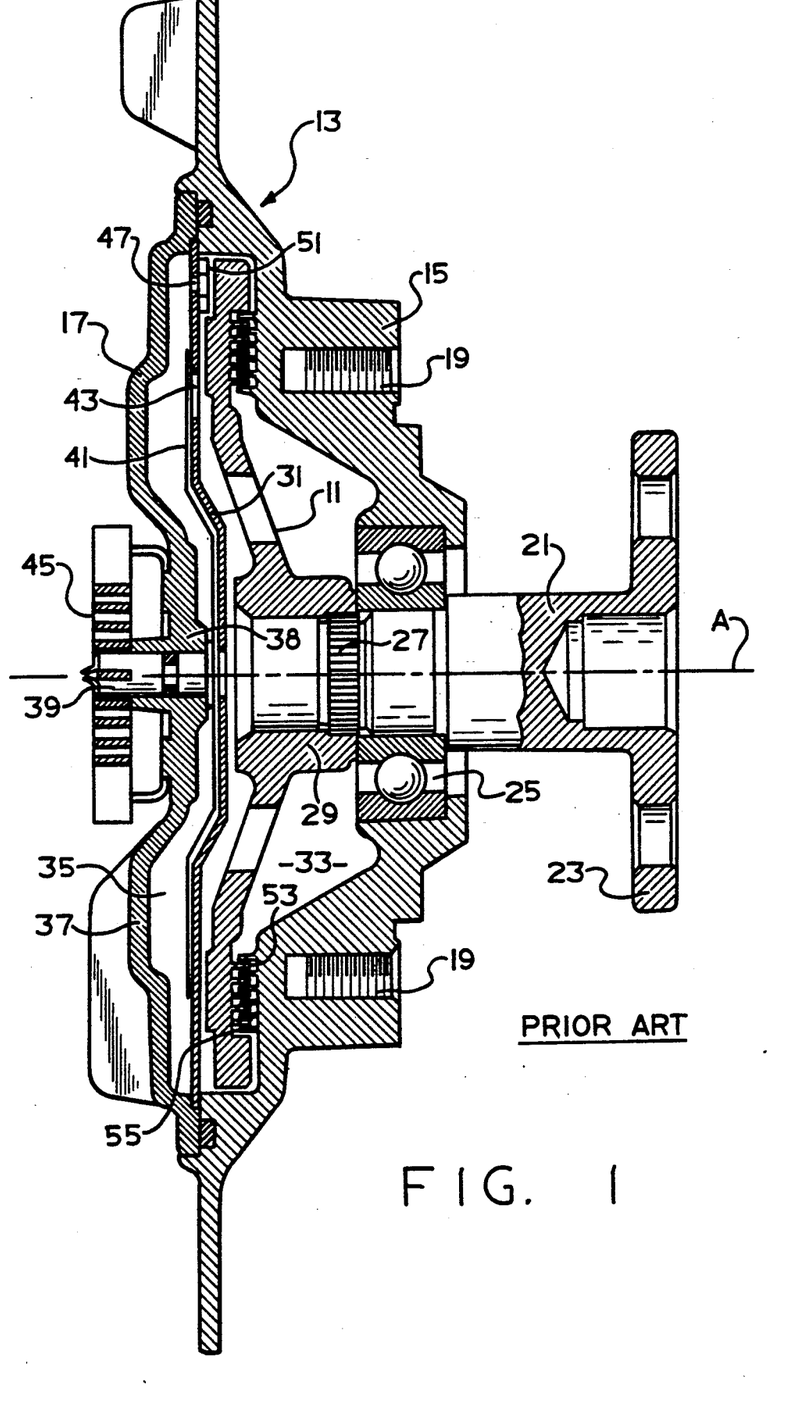
FIG. 1 is an axial cross-section of a typical fluid coupling device of the type with which the present invention may be utilized.

Referring now to the drawings, which are not intended to limit the invention, FIG. 1 illustrates one preferred form of a fluid coupling device (referred to also as a "viscous fan drive") of a type with which the present invention may be utilized. The fluid coupling device (labeled "PRIOR ART" in FIG. 1) includes an input coupling member, generally designated 11, and an output coupling assembly, generally designated 13. The assembly 13 includes a die-cast housing member 15, and a die-cast cover member 17, the members 15 and 17 being secured together by a rollover of the outer periphery of the housing member 15, as is well known in the art. The fluid coupling device is adapted to be driven by a liquid cooled engine, and, in turn, drives a radiator cooling fan, neither the engine nor the fan being shown herein. The fan may be attached to the housing member 15 by means of a plurality of threaded bores 19. It should be understood, however, that the use of the present invention is not limited to any particular configuration of fluid coupling device, or any particular application thereof, except as specifically noted hereinafter.

The coupling device includes an input shaft 21 on which the input coupling member 11 is mounted. The input shaft 21 is rotatably driven, typically by means of a flange 23, which may be bolted to the mating flange of an engine water pump (not shown). The input shaft 21 functions as a support for the inner race of a bearing set 25, which is seated on the inside diameter of the housing member 15. The forward end (left end in FIG. 1) of the input shaft 21 has an interference fit between a serrated portion 27, and an opening defined by a hub portion 29 of the input coupling member 11. As a result, rotation of the input shaft 21 causes rotation of the input coupling member 11.

The housing member 15 and the cover member 17 cooperate to define a fluid chamber, which is separated by means of a circular plate-like member (valve plate) 31, into a fluid operating chamber 33, and a fluid reservoir chamber 35. Thus, it may be seen that the input coupling member 11 is disposed within the fluid operating chamber 33.

The cover member 17 defines a raised, annular reservoir-defining portion 37, which is disposed to be generally concentric about an axis of rotation A of the device, and further defines a generally cylindrical shaft support portion 38. Rotatably disposed within the portion 38 is a valve shaft 39, extending outwardly (to the left in FIG. 1) through the cover member 17. Attached to the inner end (right end in FIG. 1) of the valve shaft 39 is a valve arm 41, which may be better understood by reference to U.S. Pat. No. 3,055,473, assigned to the assignee of the present invention, and incorporated herein by reference. Movement of the valve arm 41 controls the flow of fluid from the reservoir chamber 35 to the operating chamber 33, through a fill opening 43 formed in the valve plate 31.

Operatively associated with the outer end of the valve shaft 39 is a temperature-responsive bimetal element, comprising a coil member 45, which includes an inner end portion in engagement with the valve shaft 39. The manner in which the bimetal coil member 45 operates to control movement of the valve arm 41, in response to variations in a predetermined temperature condition, is well known in the art, is not an essential feature of the present invention, and will not be described further herein.

Disposed adjacent the radially outer periphery of the operating chamber 33, the valve plate 31 defines a discharge opening 47. Disposed adjacent the opening 47 is a pumping element 51, also referred to as a "wiper", operable to engage the relatively rotating fluid in the operating chamber 33, to generate a localized region of relatively higher fluid pressure, and continually pump a small quantity of fluid back into the reservoir chamber 35, through the opening 47, as is well known in the art. For further explanation of the function and operation of pumping elements, see U.S. Pat. No. 4,271,946, which is assigned to the assignee of the present invention and incorporated herein by reference.

In the subject embodiment of the invention, the input coupling member 11 includes a rearward surface which defines a plurality of annular lands 53. The adjacent surface of the housing member 15 forms a plurality of annular lands 55. The annular lands 53 and 55 are interdigitated to define a serpentine-shaped viscous shear space therebetween, the viscous shear space being referred to hereinafter by means of the reference numerals 53, 55. It is believed that in view of the above-incorporated U.S. Pat. No. 3,055,473, those skilled in the art can fully understand the construction and operation of the fluid coupling device illustrated in FIG. 1, as well as the various flow paths for the viscous fluid, as the fluid normally flows through a "PRIOR ART" fluid coupling device of the type shown in FIG. 1.

Figures 2, 3, 4:
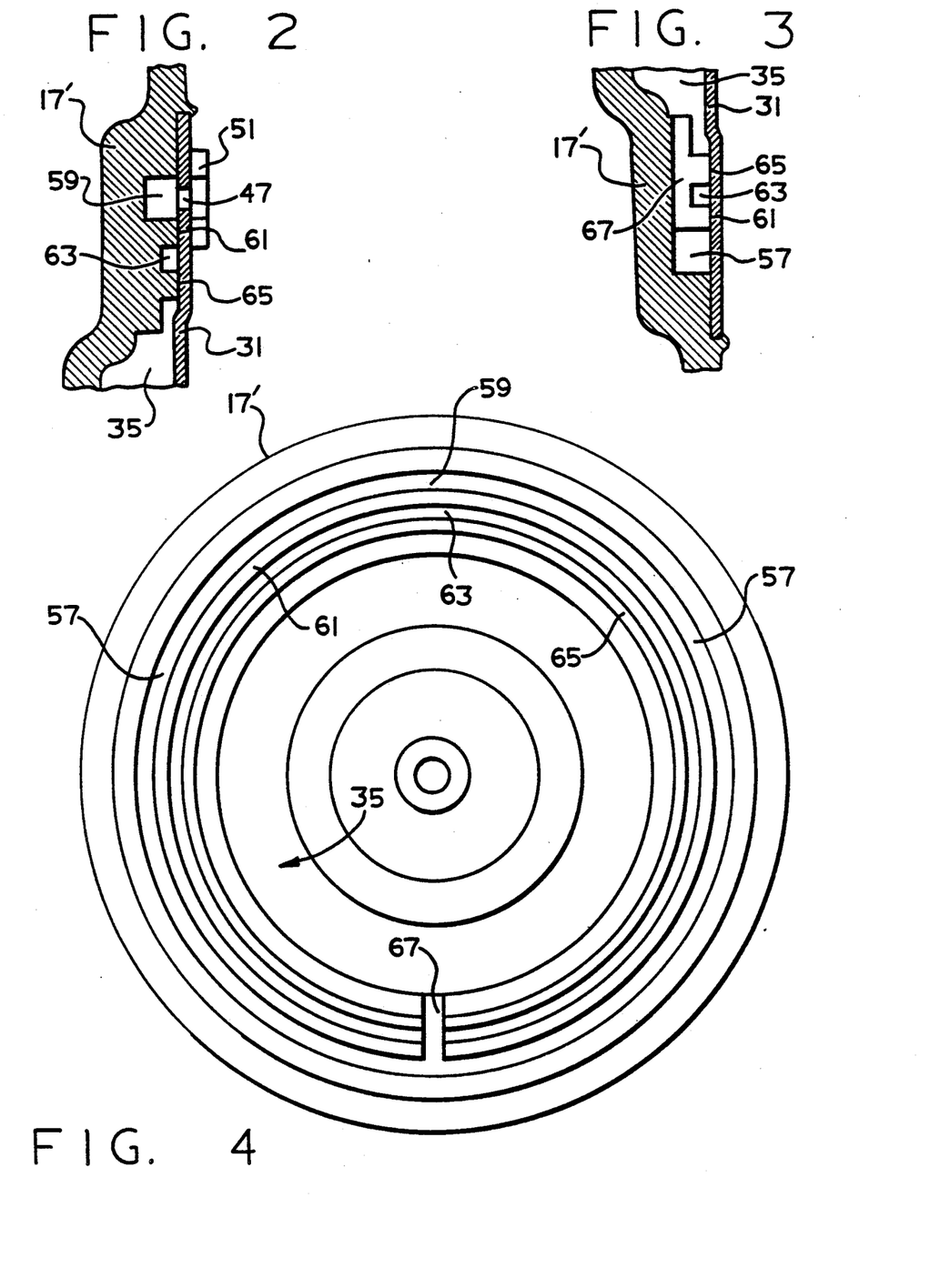
FIG. 2 is an enlarged, fragmentary, axial cross-section, similar to FIG. 1, illustrating one feature of the present invention.
FIG. 3 is an enlarged, fragmentary, axial cross-section, similar to FIG. 1, illustrating another feature of the present invention.
FIG. 4 is a rear plan view of the cover member of the coupling device, illustrating the present invention.

Referring to FIGS. 2 through 4, the present invention will now be described in some detail. The device of the present invention includes a modified cast cover member 17' which, toward its radially outer periphery, extends axially to the valve plate 31, rather than leaving an annular gap therebetween, as in FIG. 1. The cover member 17' defines an annular groove 57, which is in relatively open, unrestricted fluid communication with the discharge opening 47 (see FIG. 2).

As may best be seen in FIG. 4, the groove 57, in the preferred embodiment, defines a complete annulus, i.e., a full circle. However, it should be understood that the groove 57 defines a full circle, primarily to permit the use of two relatively smaller (in cross-section) passage halves, rather than one relatively larger passage, which would make the cover 17' non-symmetrical. For purposes of the present invention, it is essential that the annular groove 57 extend at least about 180 degrees from an upstream portion 59 (i.e., the portion in direct, immediate fluid communication with the discharge opening 47), to a downstream portion, to be described.

Disposed immediately radially inward from the groove 57, the cover member 17' defines an annular sealing land 61. Disposed radially inwardly from the land 61, the cover member 17' defines a seal ring groove 63, adapted to have disposed therein some sort of seal member (not shown herein), such as an O-ring or a square-cut seal member. Disposed radially inwardly from the seal ring groove 63 is another annular sealing land 65. It is intended that the valve plate 31 be disposed in sealing engagement with each of the sealing lands 61 and 65. Although the subject embodiment includes the seal ring groove 63, thus providing for a sealing member, it is believed possible to seal sufficiently on the sealing lands 61 and 63 to eliminate the need for a separate seal ring groove 63 and sealing member.

As may best be seen in FIGS. 3 and 4, the cover member 17' defines a radially-oriented passage 67, which may be viewed as constituting the "downstream portion" of the annular groove 57. In other words, the passage 67 provides fluid communication from the annular groove 57 to the fluid reservoir chamber 35. It is one important aspect of the present invention that most of the annular groove 57 is blocked from direct fluid communication with both the operating chamber 33 and with the reservoir chamber 35. The only locations where communication to or from the annular groove 57 occurs is through the discharge opening 47 into the upstream portion 59, and through the downstream portion 67 into the reservoir chamber 35.

Figure 5:
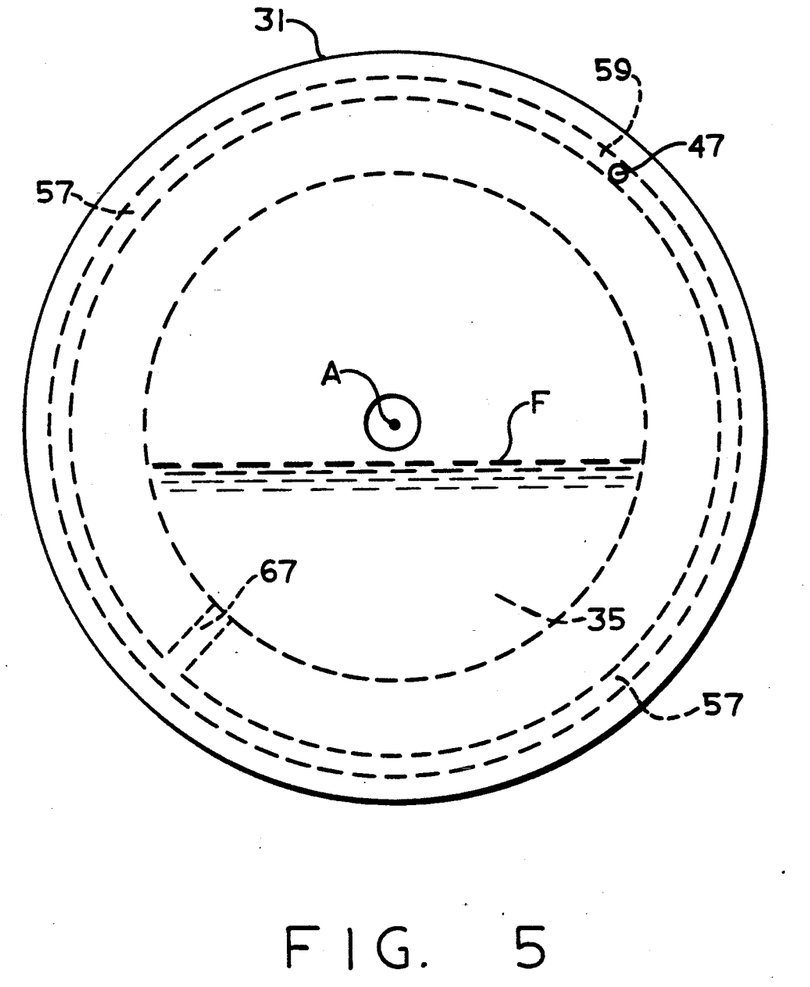
FIG. 5 is a somewhat schematic view, similar to FIG. 4, of the cover member and valve plate sub-assembly, illustrating the operation of the present invention, with the coupling device in one random orientation.
Figure 6:
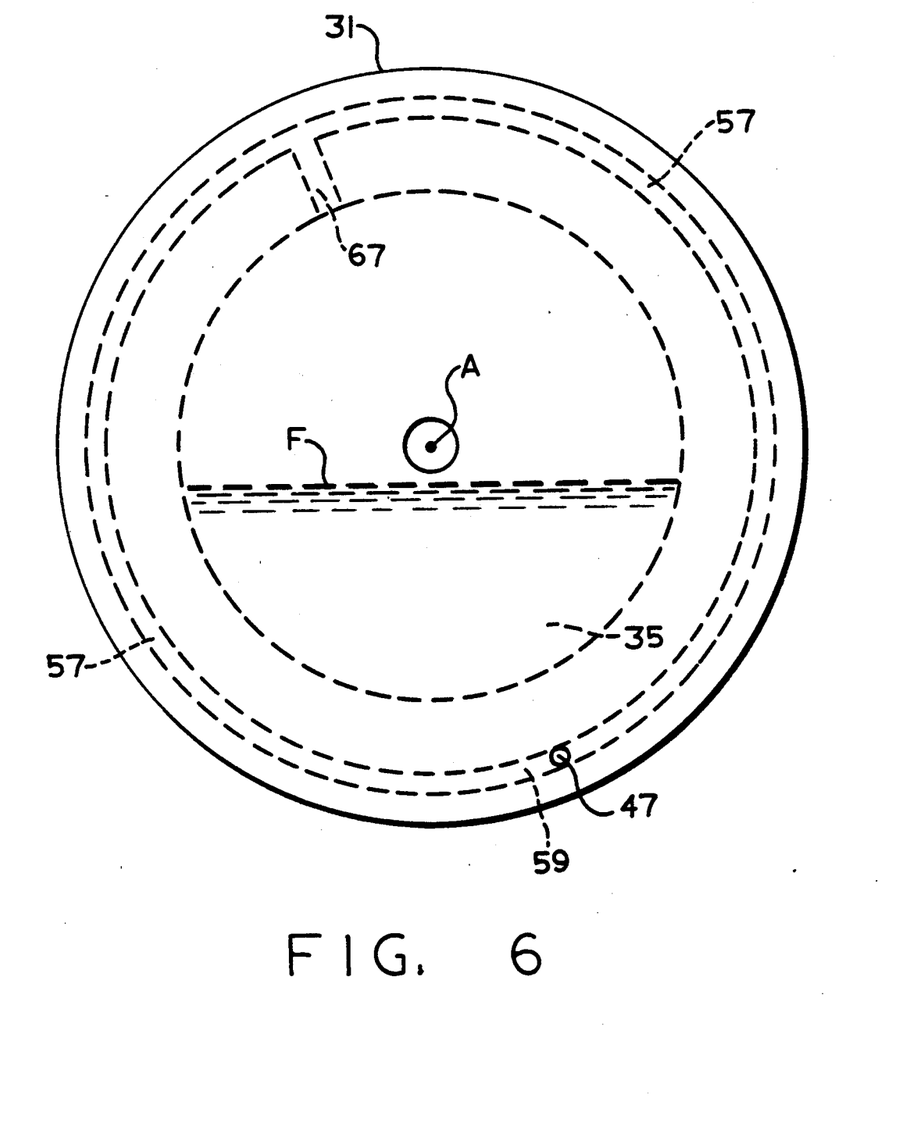
FIG. 6 is a somewhat schematic view, similar to FIG. 5, illustrating the operation of the present invention, with the coupling device in another random orientation.

It is another important aspect of the present invention that the annular groove 57 has a circumferential extent of at least about 180 degrees, or stated another way, that the upstream portion 59 and the downstream portion 67 be circumferentially displaced, relative to each other, by at least 180 degrees. The reason for such circumferential spacing may be seen by reference to FIGS. 5 and 6, which are somewhat schematic illustrations, looking through the valve plate 31, and showing (in dotted lines) only the annular groove 57 and downstream portion 67. FIGS. 5 and 6 also illustrate the fluid level F which typically occurs in such fluid coupling devices, after a major portion of the viscous fluid has been pumped out of the operating chamber 33 and into the reservoir chamber 35. It is believed that, typically, about 70% of the total fluid in the coupling device is in the reservoir chamber 35 when the device is operating in the disengaged condition.

Referring first to FIG. 5, with the device rotated to a position in which the downstream portion 67 is below the fluid level F, a certain amount of viscous fluid will flow from the reservoir chamber 35, through the downstream portion 67, and fill the annular groove 57 on both sides (circumferentially) of the downstream portion 67. However, as will be understood by those skilled in the art, the level of fluid in the annular groove 57 cannot rise above the fluid level F, and therefor, in any of the orientations represented by FIG. 5, no fluid will flow from the reservoir chamber 35 back into the operating chamber 33.

Referring now to FIG. 6, with the coupling device rotated to a position in which the discharge opening 47 and upstream portion 59 are disposed below the fluid level F, it is not possible for any of the viscous fluid in the reservoir chamber 35 to enter the annular groove 57, and, in accordance with an important aspect of the present invention, fluid can enter the annular groove 57 only through the downstream portion 67 which, in any of the orientations represented by FIG. 6, is above the fluid level F.

In comparing FIGS. 5 and 6, and noting the fluid level F, it may be seen that as long as either the discharge opening 47 or the downstream portion 67 is above the fluid level F, no bleedback of fluid from the reservoir chamber 35 into the operating chamber 33 can occur, unless there is leakage from the reservoir chamber 35 directly into the annular groove 57, when the coupling device is in one of the orientations represented by FIG. 6.

In referring to the circumferential extent of the annular groove 57 (or the circumferential displacement of the upstream portion 59 and downstream portion 67), reference to an extent "of at least 180 degrees" will be better understood from FIGS. 5 and 6. If the fluid level F in FIGS. 5 and 6 were up to the axis of rotation A, the circumferential extent would have to be at least 180 degrees, in order to avoid any possibility of bleedback from the reservoir chamber into the operating chamber. However, as may be seen in FIGS. 5 and 6, the typical fluid level F is somewhat below the axis of rotation A of the coupling device and, therefor, the circumferential extent of the annular groove 57 could be somewhat less than 180 degrees and still serve the intended function. It is essential only that for any orientation of the coupling device, either the discharge opening 47 or the downstream portion 67, be disposed above the fluid level F.

Figure 7:
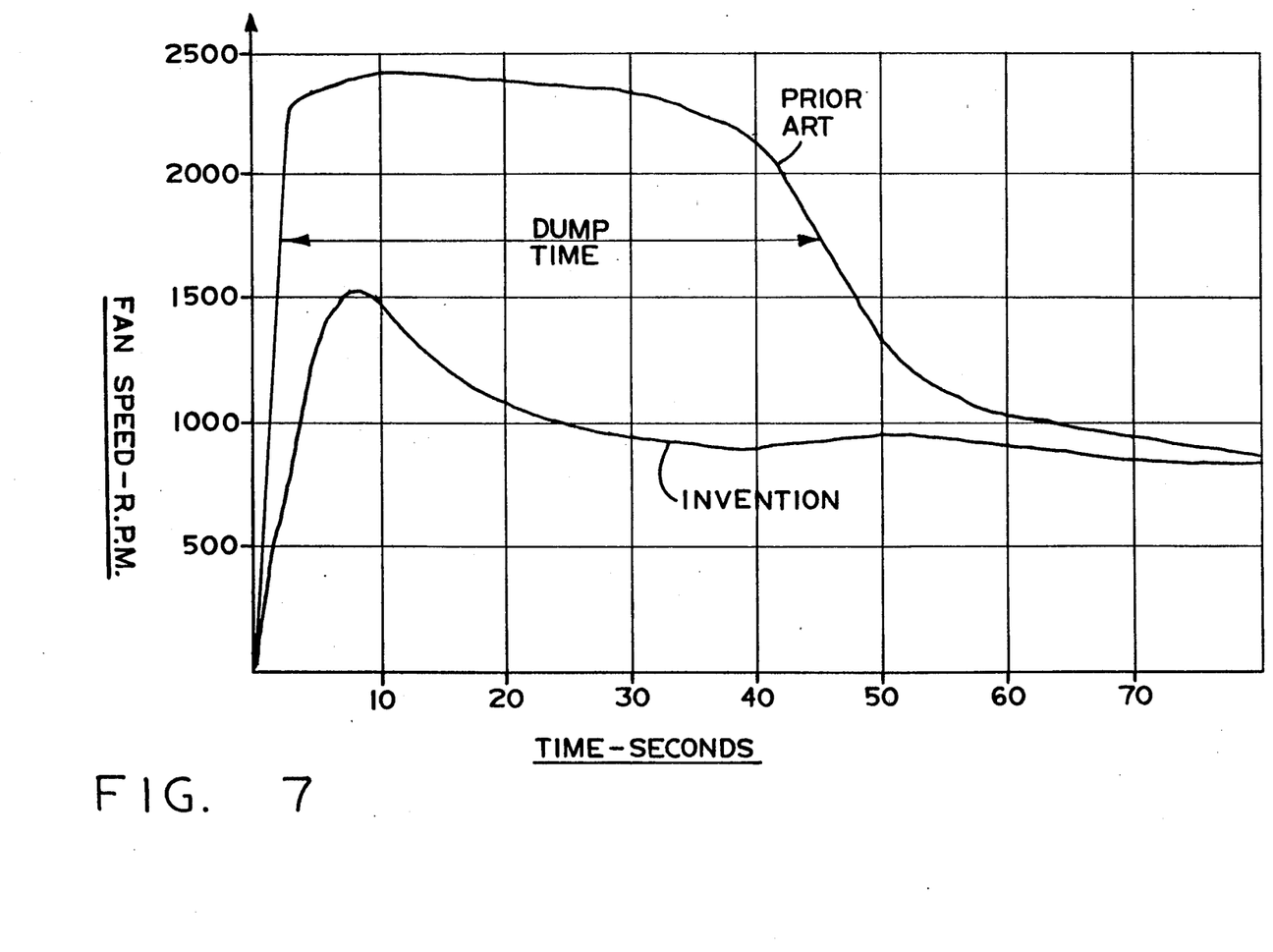
FIG. 7 is a graph of fan speed (RPM) versus. time, comparing the prior art and the present invention.

Referring now to FIG. 7, there is illustrated a graph of fan speed (in R.P.M.) versus time (in seconds), comparing the prior art and the present invention. The purpose of performing the test which resulted in the graph of FIG. 7 is to determine a "dump time" for the particular coupling device. The "dump time" has typically been defined as the time required to disengage the device from full speed (on the way up the curve) to 1750 R.P.M. (on the way down the curve), at 2500 R.P.M. input speed.

As may be seen in FIG. 7, with the prior art device, elapsed "dump time" to get from 1750 R.P.M. to 1750 R.P.M. on the way back down is approximately 43 seconds, a "dump time" which in many applications has been considered acceptable, but which, in some applications, may not be considered acceptable.

By way of contrast, with the device utilizing the present invention, the reduced amount of fluid which remains in the operating chamber causes the coupling device to reach a peak speed of slightly over 1500 R.P.M. and then, as that fluid is pumped out, the speed quickly drops off, below 1000 R.P.M., and finally levels off at a typical idle speed of approximately 800–1000 R.P.M. Thus, because the fan speed never reached 1750 R.P.M. in FIG. 7, the coupling represented therein has, by definition, a "dump time" of 0 seconds.

Figure 8:
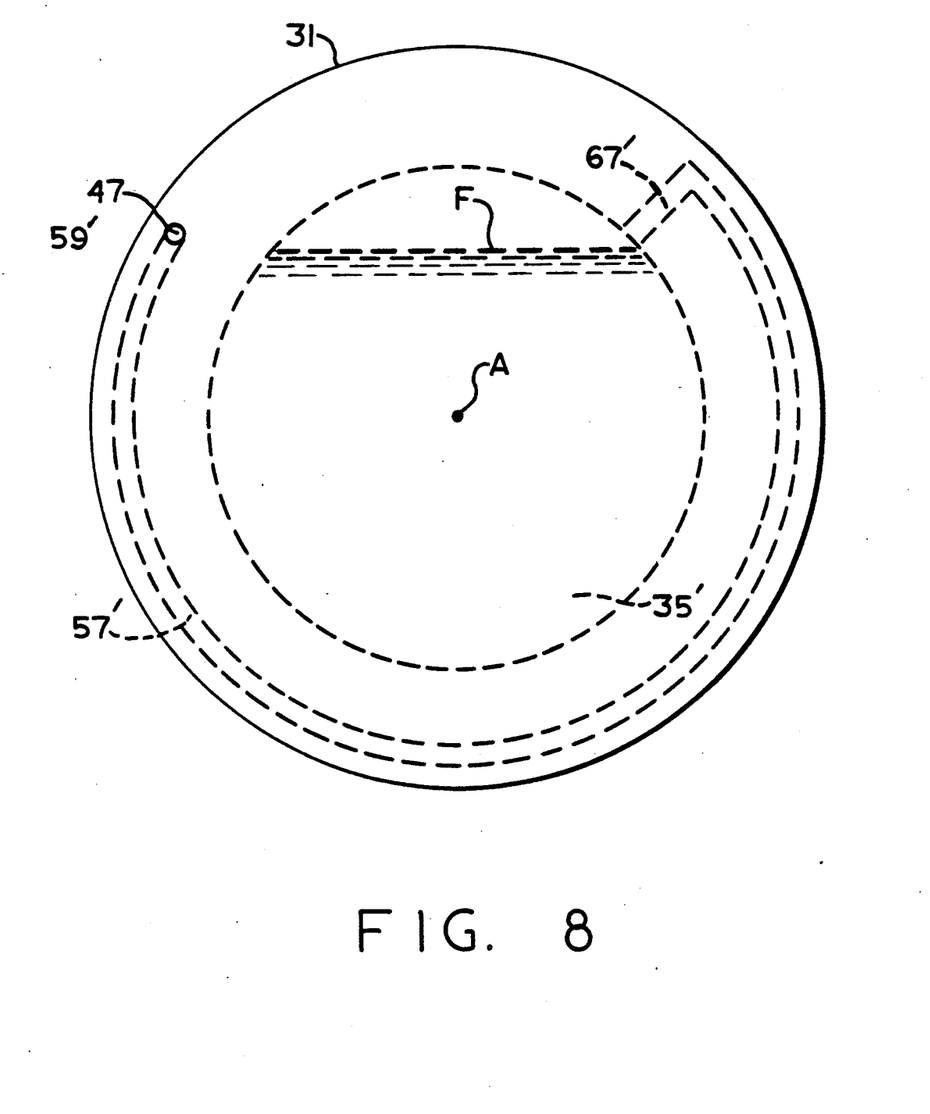
FIG. 8 is a somewhat schematic view, similar to FIGS. 5 and 6, illustrating an alternative embodiment of the present invention.

Referring now to FIG. 8, there is illustrated an alternative embodiment of the present invention which further illustrates the principle stated previously that the circumferential extent of the annular groove must be such that either the upstream portion or the downstream portion will be above the fluid level in the reservoir. In the FIG. 8 embodiment, it is desired to have a greater quantity of fluid in the reservoir chamber, such that the fluid level F is much higher in the reservoir. The discharge opening 47 and the upstream portion 59' are circumferentially displaced from the downstream portion 67' by approximately 270 degrees, and therefore, the annular groove 57' has a circumferential extent of approximately 270 degrees. It should be understood that, whenever the fluid level F is above the axis A, and the extent of the annular groove is greater than 180 degrees, the cover and valve plate subassembly may still be designed for either direction of rotation merely by reversing the positions of the pumping element 51 and the discharge opening 47.

The invention has been described in great detail, sufficient to enable one skilled in the art to make and use the same. Various alterations and modifications of the invention will occur to those skilled in the art upon a reading and understanding of the foregoing specification, and it is intended to include all such alterations and modifications as part of the invention, insofar as they come within the scope of the appended claims.

I claim:

1. A fluid coupling device of the type including a first rotatable coupling member defining an axis of rotation, enclosure means associated with said first coupling member to define a fluid chamber therebetween; valve means associated with said first coupling member and disposed to separate said fluid chamber into a fluid operating chamber and a fluid reservoir chamber; a second rotatable coupling member disposed in said fluid operating chamber and being rotatable relative to said first coupling member, one of said first coupling member and said enclosure means cooperating with said second coupling member to define a viscous shear space therebetween, said valve means being operative to control the flow of fluid between said reservoir chamber and said operating chamber; means operable to pump fluid from said operating chamber into said reservoir chamber in response to a difference in speed of rotation of said first and second coupling members; said valve means including a plate-like member disposed between said operating chamber and said reservoir chamber, and having at least its outer periphery disposed in tight sealing engagement with one of said enclosure means and said first coupling member, said plate-like member being provided with a pumping element, and defining a discharge opening; characterized by:

(a) said enclosure means and said plate-like member cooperating to define a generally annular groove blocked, over at least a major portion thereof, from fluid communication with said operating chamber and with said reservoir chamber;

(b) said annular groove including an upstream portion in open fluid communication with said discharge opening, and a downstream portion in open fluid communication with said reservoir chamber; and (c) said annular groove having a circumferential extent of at least about 180 degrees.

2. A fluid coupling device as claimed in claim 1, characterized by said valve means further including control means associated with said valve means to effect operation thereof in response to variations in a predetermined condition.

3. A fluid coupling device as claimed in claim 1, characterized by said valve means including said plate-like member defining a fluid inlet port, and further including a movable valve member operable to control the flow of fluid through said fluid inlet port, in response to variations in said predetermined condition.

4. A fluid coupling device as claimed in claim 3, characterized by said fluid inlet port being disposed radially inwardly from at least a major portion of said viscous shear space.

5. A fluid coupling device as claimed in claim 4, characterized by said discharge opening being disposed radially outwardly from at least a major portion of said viscous shear space.

6. A fluid coupling device as claimed in claim 1, characterized by said annular groove having a circumferential extent equal to at least 180 degrees.

7. A fluid coupling device as claimed in claim 1, characterized by said annular groove having a circumferential extent of 360 degrees, whereby said annular groove is operable to communicate fluid from said discharge opening to said reservoir chamber through two generally identical passage halves.

8. A fluid coupling device as claimed in claim 7, characterized by said upstream portion and said downstream portion being circumferentially displaced, relative to each other, approximately 180 degrees.

9. A fluid coupling device as claimed in claim 1, characterized by said fluid level being disposed above said axis of rotation, said annular groove having a circumferential extent greater than 180 degrees, whereby, for any rotational orientation of the fluid coupling device, at least one of said upstream portion and said downstream portion is disposed above said fluid level.

10. A fluid coupling device of the type including a first rotatable coupling member defining an axis of rotation, enclosure means associated with said first coupling member to define a fluid chamber therebetween; valve means associated with said first coupling member and disposed to separate said fluid chamber into a fluid operating chamber and a fluid reservoir chamber; a second rotatable coupling member disposed in said fluid operating chamber and being rotatable relative to said first coupling member, one of said first coupling member and said enclosure means cooperating with said second coupling member to define a viscous shear space therebetween, said valve means being operative to control the flow of fluid between said reservoir chamber and said operating chamber; means operable to pump fluid from said operating chamber into said reservoir chamber in response to a difference in speed of rotation of said first and second coupling members; said valve means including a plate-like member disposed between said operating chamber and said reservoir chamber, and having at least its outer periphery disposed in tight sealing engagement with one of said enclosure means and said first coupling member, said plate-like member being provided with a pumping element, and defining a discharge opening; the fluid in said fluid reservoir chamber defining a fluid level when a major portion of the fluid in the fluid coupling device is disposed in said fluid reservoir chamber; characterized by:

(a) said enclosure means and said plate-like member cooperating to define a generally annular groove blocked, over at least a major portion thereof, from fluid communication with said operating chamber and with said reservoir chamber;

(b) said annular groove including an upstream portion in open fluid communication with said discharge opening, and a downstream portion in open fluid communication with said reservoir chamber; and (c) said annular groove having a circumferential extent such that, for any rotational orientation of the fluid coupling device, at least one of said upstream portion and said downstream portion is disposed above said fluid level.

11. A fluid coupling device as claimed in claim 10, characterized by said valve means including said plate-like member defining a fluid inlet port, and further including a movable valve member operable to control the flow of fluid through said fluid inlet port, in response to variations in said predetermined condition.

12. A fluid coupling device as claimed in claim 11, characterized by said fluid inlet port being disposed radially inwardly from at least a major portion of said viscous shear space.

13. A fluid coupling device as claimed in claim 12, characterized by said discharge opening being disposed radially outwardly from at least a major portion of said viscous shear space.

14. A fluid coupling device as claimed in claim 10, characterized by said annular groove having a circumferential extent of 360 degrees, whereby said annular groove is operable to communicate fluid from said discharge opening to said reservoir chamber through two generally identical passage halves.

15. A fluid coupling device as claimed in claim 14, characterized by said upstream portion and said downstream portion being circumferentially displaced, relative to each other, approximately 180 degrees.

* * * * *